(12) United States Patent
Fujii et al.

(10) Patent No.: US 7,929,273 B2
(45) Date of Patent: Apr. 19, 2011

(54) CHIP TYPE SOLID ELECTROLYTIC CAPACITOR

(75) Inventors: Tatsuo Fujii, Osaka (JP); Junichi Kurita, Osaka (JP); Hiroshi Fujii, Osaka (JP); Tsuyoshi Yoshino, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/821,568

(22) Filed: Jun. 23, 2010

(65) Prior Publication Data

US 2010/0259868 A1 Oct. 14, 2010

Related U.S. Application Data

(63) Continuation of application No. 11/719,029, filed as application No. PCT/JP2006/300690 on Jan. 19, 2006, now Pat. No. 7,778,011.

(30) Foreign Application Priority Data

Jan. 24, 2005 (JP) .................................. 2005-015082

(51) Int. Cl.
*H01G 9/00* (2006.01)
(52) U.S. Cl. ........ 361/523; 361/516; 361/519; 361/525; 361/528; 361/529
(58) Field of Classification Search .................. 361/523, 361/516–519, 525, 528–529, 540–541, 502–504, 361/509–512; 29/25.01, 23.03
See application file for complete search history.

(56) References Cited

U.S. PATENT DOCUMENTS

| 6,343,004 | B1 * | 1/2002 | Kuranuki et al. |
| 6,392,869 | B2 * | 5/2002 | Shiraishi et al. ............... 361/523 |
| 6,421,227 | B2 * | 7/2002 | Nitoh et al. |
| 6,535,375 | B1 * | 3/2003 | Jung et al. ...................... 361/523 |
| 6,616,713 | B2 * | 9/2003 | Sano et al. |
| 6,625,009 | B2 * | 9/2003 | Maeda |
| 6,706,078 | B2 * | 3/2004 | Nitoh et al. |
| 6,816,358 | B2 * | 11/2004 | Kida et al. ..................... 361/540 |

(Continued)

FOREIGN PATENT DOCUMENTS

JP 60-50915 * 3/1985

(Continued)

OTHER PUBLICATIONS

Int Search Report for Int. Application No. PCT/JP2006/300690, Apr. 25, 2006, Panasonic Corporation.*

*Primary Examiner* — Nguyen T Ha
(74) *Attorney, Agent, or Firm* — RatnerPrestia

(57) ABSTRACT

A chip type solid electrolytic capacitor includes a capacitor element-laminate. In the capacitor element-laminate, a plurality of capacitor elements, each having an anode portion and a cathode portion, are laminated so that the anode portions of the adjacent capacitor elements are disposed in the direction opposite to each other. Anode lead terminals are joined to the bottom faces of the anode portions of the capacitor elements disposed at both ends of the capacitor element-laminate. A cathode lead terminal is joined to the bottom face of the cathode portion of the capacitor element disposed in the center of the capacitor element-laminate. An Electrically insulating exterior resin coats the capacitor element-laminate so as to expose at least a part of the bottom faces of the anode lead terminals and a part of the cathode lead terminal.

6 Claims, 7 Drawing Sheets

U.S. PATENT DOCUMENTS

| | | | |
|---|---|---|---|
| 6,836,401 B2 * | 12/2004 | Yoshida et al. | |
| 6,862,168 B2 * | 3/2005 | Ando et al. | 361/504 |
| 6,891,716 B2 * | 5/2005 | Maier et al. | 361/523 |
| 6,912,117 B2 * | 6/2005 | Arai et al. | |
| 7,070,631 B2 * | 7/2006 | Monden et al. | |
| 7,139,164 B2 * | 11/2006 | Horio et al. | 361/540 |
| 7,190,571 B2 * | 3/2007 | Heusmann et al. | 361/523 |
| 7,198,733 B2 * | 4/2007 | Konuma et al. | |
| 7,215,533 B2 * | 5/2007 | Kurita et al. | |
| 7,289,314 B2 * | 10/2007 | Kobayashi et al. | |
| 7,609,505 B2 * | 10/2009 | Naito et al. | 361/523 |
| 7,646,589 B2 * | 1/2010 | Kuriyama | 361/528 |
| 7,706,132 B2 * | 4/2010 | Kawahito et al. | 361/523 |

FOREIGN PATENT DOCUMENTS

| | | | |
|---|---|---|---|
| JP | 01-175223 | * | 7/1989 |
| JP | 06-120088 | * | 4/1994 |
| JP | 06-124858 | * | 5/1994 |
| JP | 06-267801 | * | 9/1994 |
| JP | 2001-230156 | * | 8/2001 |
| JP | 2002-260968 A | * | 9/2002 |
| JP | 2002-367862 A | * | 12/2002 |
| JP | 2003-045755 A | * | 2/2003 |

* cited by examiner

CHIP TYPE SOLID ELECTROLYTIC CAPACITOR

This application is a continuation application of Ser. No. 11/719,029 filed May 10, 2007 which is a U.S. National Phase Application of PCT International Patent Application No. PCT/JP2006/300690, which are incorporated by reference.

TECHNICAL FIELD

The present invention relates to a chip type solid electrolytic capacitor that includes conductive polymer as a solid electrolyte and can be surface-mounted among capacitors for use in various kinds of electronic equipment.

BACKGROUND ART

As electronic equipment is used at higher frequencies, a capacitor, i.e. one of the electronic components thereof, is required to have more excellent impedance characteristics in a higher-frequency range than conventional capacitors. To meet such a requirement, a solid electrolytic capacitor using conductive polymer having high electric conductivity as a solid electrolyte thereof is studied.

Additionally, there have recently been strong demands for a smaller solid electrolytic capacitor with higher capacity that is to be used around the CPU of a personal computer. Further, to support higher frequencies, there are strong demands for excellent ability of noise reduction and transient response, and reduction in equivalent serial inductance (lower ESL) as well as reduction in equivalent serial resistance (lower ESR). Various studies are conducted to satisfy these demands.

FIG. 9 is a perspective view illustrating a structure of a conventional chip type solid electrolytic capacitor. FIG. 10 is an exploded perspective view illustrating an inner structure thereof. Capacitor elements 20 including a conductive polymer as a solid electrolyte thereof form a major portion of the solid electrolytic capacitor. Each capacitor element 20 includes anode portion 21, cathode portion 22, and insulator 23. Two capacitor elements 20 structured as above are placed one on the other in the direction opposite to each other.

One end of anode lead terminal 24 is connected to anode portion 21. One end of cathode lead terminal 25 is connected to cathode portion 22. Exterior resin 26 molds these components. In this manner, the solid electrolytic capacitor is formed. Anode lead terminals 24 and cathode lead terminals 25 are exposed from the side faces and the bottom face, respectively, of the solid electrolytic capacitor to face each other. Thus, the solid electrolytic capacitor having a four-terminal structure is formed.

The conventional chip type solid electrolytic capacitor structured as above is excellent in high-frequency characteristics and noise-absorbing ability, and capable of achieving lower ESL. Such a chip type solid electrolytic capacitor is disclosed in Unexamined Japanese Patent Publication No. H06-120088, for example.

However, for the conventional chip type solid electrolytic capacitor, reduction in ESL is limited to approx. 500 pH. In other words, the conventional one is still insufficient to satisfy a level of 200 pH or lower, which is required in the recent market, and requires further reduction in ESL.

SUMMARY OF THE INVENTION

A chip type solid electrolytic capacitor of the present invention includes a capacitor element-laminate. In the capacitor element-laminate, a plurality of capacitor elements, each having an anode portion and a cathode portion, are laminated so that the anode portions of the adjacent capacitor elements are disposed in the direction opposite to each other. Anode lead terminals are joined to the bottom faces of the anode portions of the capacitor elements disposed at both ends of the capacitor element-laminate. A cathode lead terminal is joined to the bottom face of the one of the cathode portions of the capacitor elements. The bottom face is disposed in the center of the capacitor element-laminate. An electrically insulating exterior resin coats the capacitor element-laminate so as to expose at least a part of the bottom faces of the anode lead terminals and a part of cathode lead terminal. This chip type solid electrolytic capacitor has a three-terminal structure including anode terminals disposed at both ends of the bottom face thereof, and a cathode terminal disposed therebetween. This structure allows magnetic fluxes generated by the current through the respective terminals to cancel out each other and thus considerably reduces ESL. A structure having a distance between each terminal as small as possible can further reduce ESL.

DETAILED DESCRIPTION OF PREFERRED EMBODIMENTS

A description is provided of exemplary embodiments of the present invention with reference to the accompanying drawings. In each of the exemplary embodiments, components similar to those of the preceding embodiment are denoted with the same reference marks, and the detailed descriptions thereof are omitted.

First Exemplary Embodiment

Figure 1A:
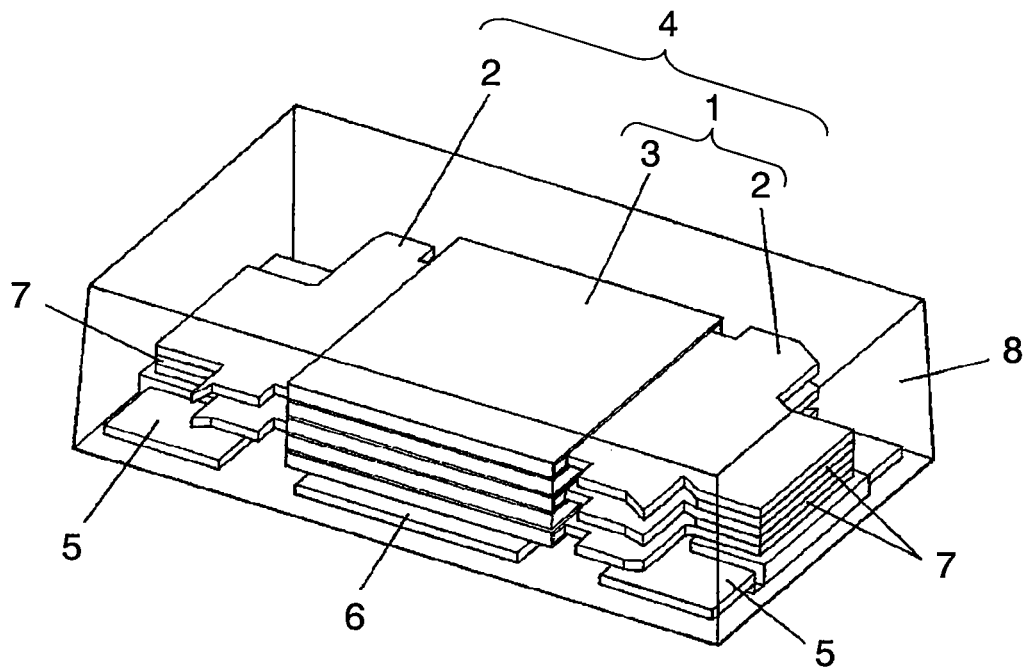
FIG. 1A is a perspective view through a transparent top face illustrating an inner structure of a chip type solid electrolytic capacitor in accordance with a first exemplary embodiment of the present invention.
Figure 1B:
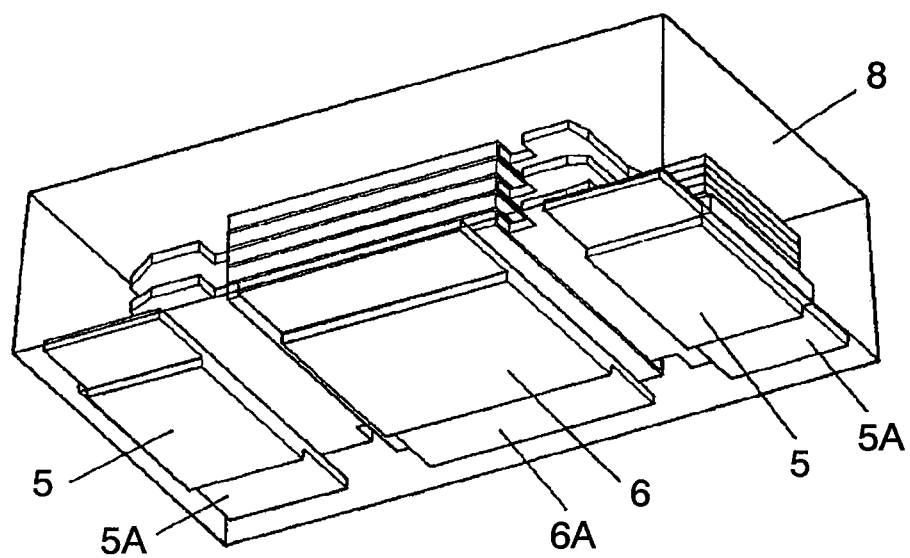
FIG. 1B is a perspective view through a transparent bottom face of the chip type solid electrolytic capacitor shown in FIG. 1A.
Figure 2A:
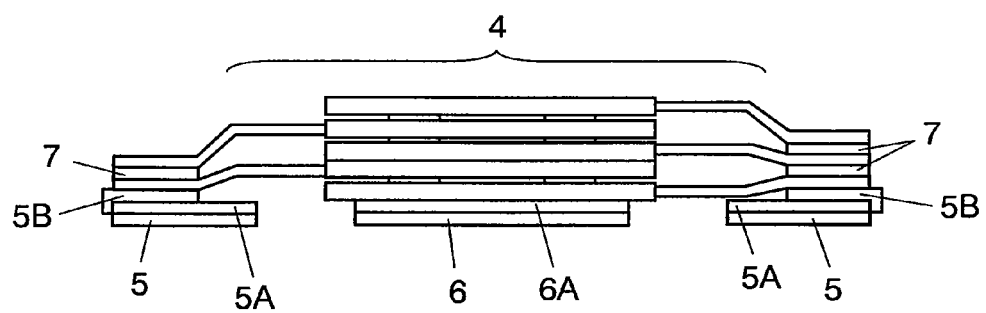
FIG. 2A is a side elevational view of a capacitor element-laminate for use in the chip type solid electrolytic capacitor shown in FIG. 1A.
Figure 2B:
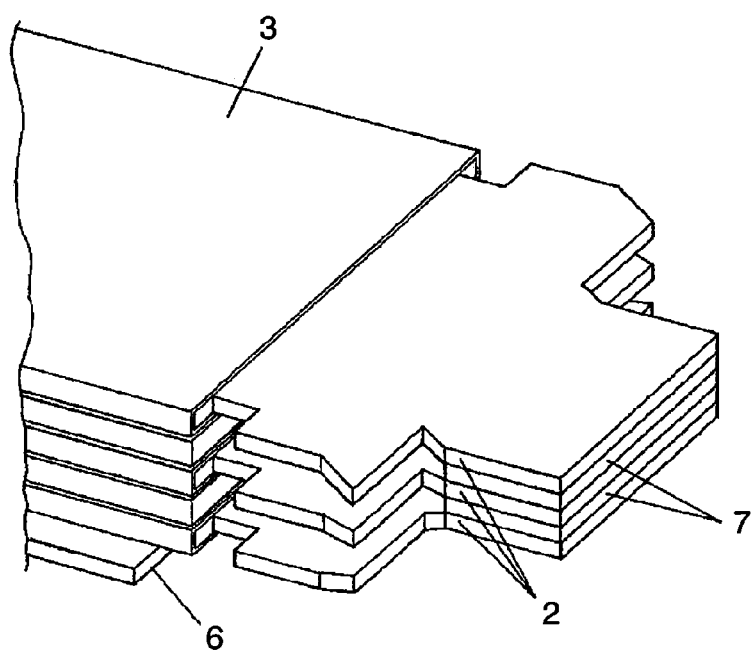
FIG. 2B is a perspective view of an essential part of the capacitor element-laminate shown in FIG. 2A.
Figure 3A:
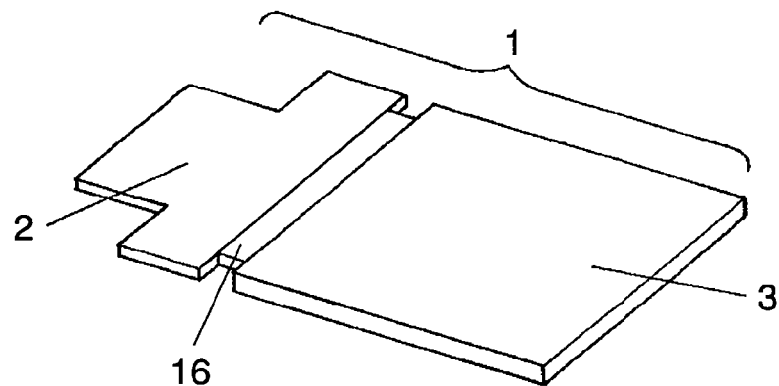
FIG. 3A is a perspective view illustrating one of capacitor elements for use in the chip type solid electrolytic capacitor shown in FIG. 1A.
Figure 3B:
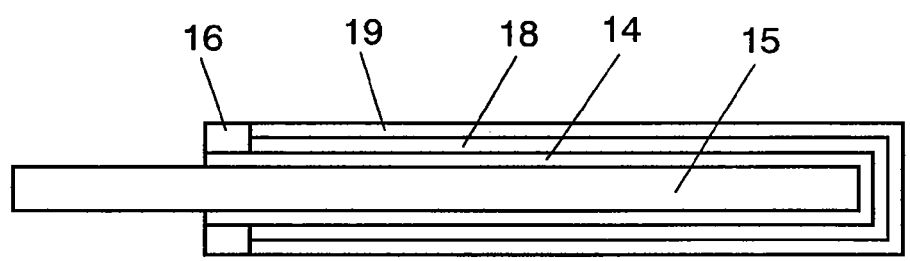
FIG. 3B is a sectional view of the capacitor element shown in FIG. 3A.
Figure 3C:
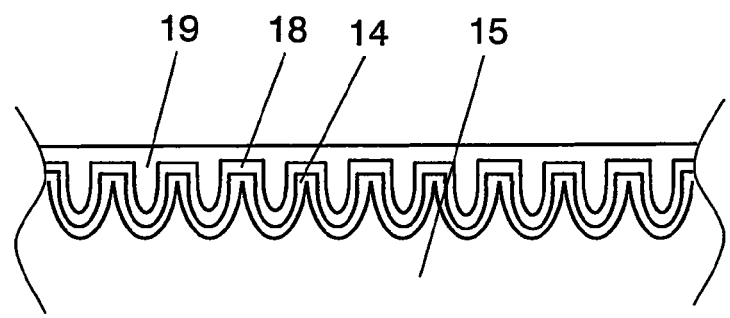
FIG. 3C is an enlarged view of an essential part in FIG. 3B.
Figure 4:
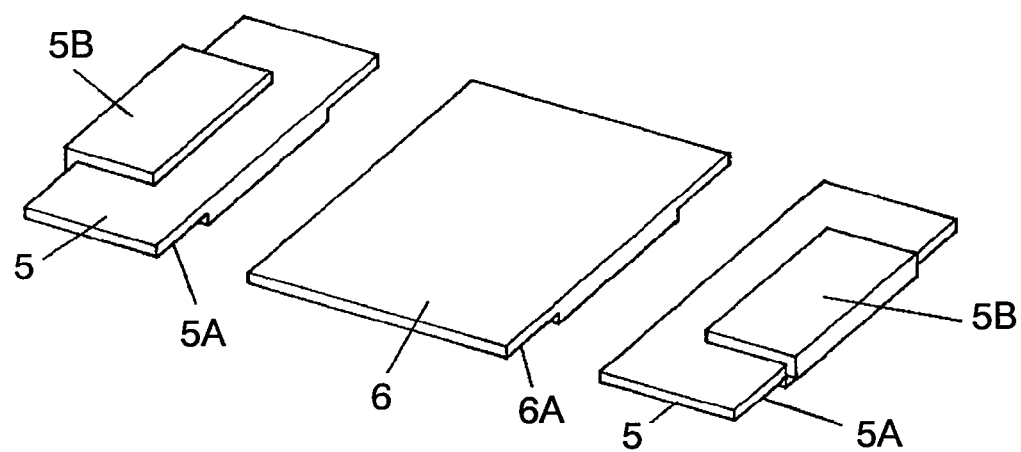
FIG. 4 is a perspective view illustrating each lead terminal for use in the chip type solid electrolytic capacitor shown in FIG. 1A.
Figure 5:
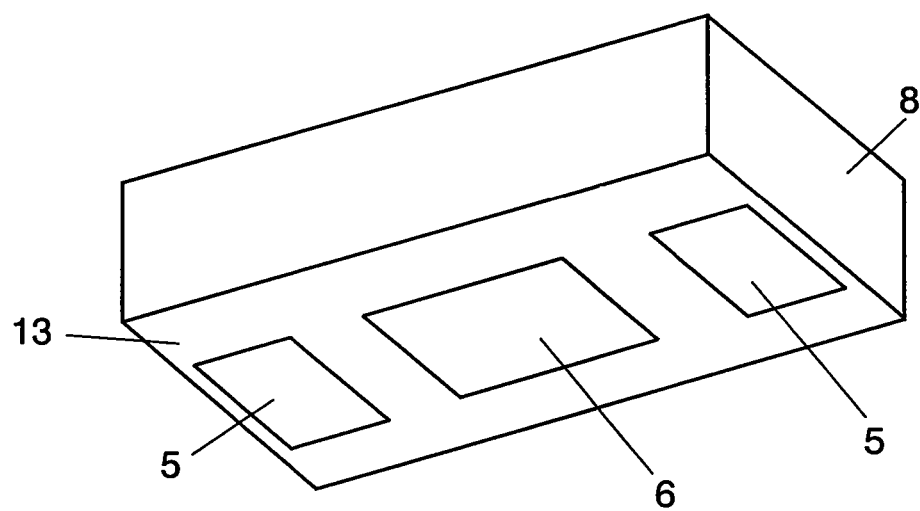
FIG. 5 is a perspective view from a bottom face of the chip type solid electrolytic capacitor shown in FIG. 1A.

FIGS. 1A and 1B are perspective views through a transparent top and bottom faces, respectively, illustrating an inner structure of a chip type solid electrolytic capacitor in accordance with a first exemplary embodiment of the present invention. FIG. 2A and FIG. 2B are a side elevational view and a perspective view of an essential part, respectively, illustrating a capacitor element-laminate for use in the chip type solid electrolytic capacitor. FIG. 3A is a perspective view illustrating one of the capacitor elements for use in the chip type solid electrolytic capacitor. FIG. 3B is a sectional view of the capacitor element. FIG. 3C is an enlarged view of an essential part in FIG. 3B. FIG. 4 is a perspective view illustrating each lead terminal for use in the chip type solid electrolytic capacitor. FIG. 5 is a perspective view from a bottom face of the chip type solid electrolytic capacitor.

Capacitor element 1 includes anode portion 2 and cathode portion 3. Capacitor element 1 is fabricated in the following process. Insulator 16 is provided in a predetermined position of anode body 15 that is made of a valve metal having a roughened surface and has dielectric oxide coating layer 14 formed thereon, so as to divide the anode body into anode portion 2 and a cathode-forming part. To dielectric oxide coating layer 14 in the cathode-forming part, solid electrolyte layer 18 made of conductive polymer, and cathode layer 19 made of carbon and silver paste are sequentially formed. Thus, cathode portion 3 is formed. In other words, capacitor element 1 includes anode body 15 having a roughened surface and made of a valve metal, dielectric oxide coating layer 14 formed on the surface of anode body 15, and insulator 16 dividing anode body 15 into anode portion 2 and cathode portion 3. Cathode portion 3 is formed of solid electrolyte layer 18 made of conductive polymer on dielectric oxide coating layer 14, and cathode layer 19 formed on solid electrolyte layer 18.

Capacitor element-laminate (hereinafter abbreviated as "laminate") 4 is made by laminating a plurality of sheets of capacitor elements 1. More specifically, laminate 4 is made by laminating the sheets of capacitor elements 1 so that anode portions 2 of the adjacent sheets of capacitor elements 1 are disposed in the direction opposite to each other. In FIG. 1A, five sheets are laminated. Preferably, at least three sheets of capacitor elements 1 are laminated in view of reducing ESL.

Anode lead terminals 5 are disposed at both ends of the bottom face of laminate 4 to join to anode portions 2. In other words, anode lead terminals 5 are disposed on the side of mounting surface 13 of laminate 4. In laminate 4, adjacent capacitor elements 1 are disposed in the direction opposite to each other, and thus two anode lead terminals 5 are used. Thinner parts 5A are integrally provided at both ends of the bottom face of each of anode lead terminals 5 in the direction that crosses the direction connecting anode portions 2 and cathode portion 3. Joint 5B is integrally provided on each anode lead terminal 5 so as to project above a top face thereof in order to join to anode portion 2 in contact therewith. Such anode lead terminals 5 are made by etching, pressing, or other methods.

Cathode lead terminal 6 is disposed in the center of the bottom face of laminate 4, and joined to cathode portion 3 via a conductive adhesive or the like. Thinner parts 6A are integrally provided on cathode lead terminal 6 at both ends of the bottom face in the direction that crosses the direction connecting anode portions 2 and cathode portion 3. Such cathode lead terminal 6 is made by etching, pressing, or other methods.

ESL can be reduced by such a structure in which the distance between cathode lead terminal 6 and two anode lead terminals 5 is as small as possible.

Spacers 7 are disposed between anode portions 2 of capacitor elements 1. With spacers 7 disposed therebetween, anode portions 2 and anode lead terminal 5 are joined to each other by laser welding, resistance welding, or other methods.

Electrically insulating exterior resin 8 integrally coats laminate 4, anode lead terminals 5, and cathode lead terminal 6. Exterior resin 8 also integrally coats thinner parts 5A and thinner parts 6A provided on anode lead terminals 5 and cathode lead terminal 6, respectively. The portions of anode lead terminals 5 and cathode lead terminal 6 other than thinner parts 5A and 6A are exposed on the bottom face of exterior resin 8. Anode lead terminals 5 and cathode lead terminal 6 exposed on the bottom surface that is mounting surface 13, are surface-mounted on a printed circuit board.

The chip type solid electrolytic capacitor structured as above has a three-terminal structure including anode lead terminals 5 at both ends of mounting surface 13 and cathode lead terminal 6 therebetween. This structure allows magnetic fluxes generated by the current through the respective terminals to cancel out each other and considerably reduce ESL. Making the distance between the respective terminals as small as possible to reduce the loop current area can further reduce ESL.

Figure 10:
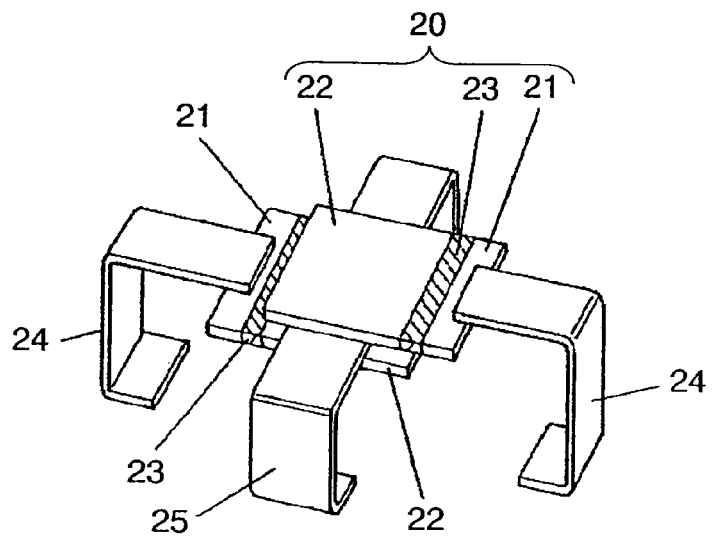
FIG. 10 is an exploded perspective view illustrating an inner structure of the chip type solid electrolytic capacitor shown in FIG. 9.

Chip type solid electrolytic capacitors having such a structure are fabricated and the ESL characteristics thereof are evaluated. The evaluation results are described as follows. The chip type solid electrolytic capacitors in accordance with this exemplary embodiment have an average ESL of 157 pH, and a variation ($\sigma$) in ESL of 1.2 pH. On the other hand, capacitors having the conventional structure of FIG. 10 have an average ESL of 522 pH, and a variation ($\sigma$) in ESL of 17.93 pH. As shown in these results, the structure of this exemplary embodiment can reduce ESL to approx. one third of that of the conventional capacitor and has a smaller variation. For these reasons, the capacitor of this exemplary embodiment can sufficiently satisfy the recent high demands for supporting higher frequencies.

In this exemplary embodiment, anode lead terminals 5 include thinner parts 5A, and cathode lead terminal 6 includes thinner parts 6A. However, these thinner parts are not essential. The advantages can be obtained by the structure in which no thinner parts 5A or 6A are provided and the bottom faces of anode lead terminals 5 and cathode lead terminal 6 are exposed on exterior resin 8.

However, it is preferable to provide at least one of thinner parts 5A and 6A. More specifically, it is preferable to dispose the bottom face of thinner part 5A at insider side of exterior resin 8 than a portion of the bottom face opposite joints 5B because the entry path of oxygen in the atmosphere increases in length. Thinner part 6A has the same function. This structure improves the air-tightness of the solid electrolytic capacitor, and thus reliability thereof.

Additionally, providing thinner parts 5A in this manner enlarges the area in which anode lead terminals 5 join to exterior resin 8. As a result, the joining strength between anode lead terminals 5 and exterior resin 8 is improved. For this reason, thinner parts 5A prevent exterior resin 8 from peeling off from anode lead terminals 5 when an external force is exerted in the direction perpendicular to a portion of the bottom face opposite joints 5B. Such an external force is generated when the solid electrolytic capacitor is removed after being mounted on a printed circuit board, for example. Also in this point, this structure improves the reliability. Thinner part 6A also has the same function.

Second Exemplary Embodiment

Figure 6A:
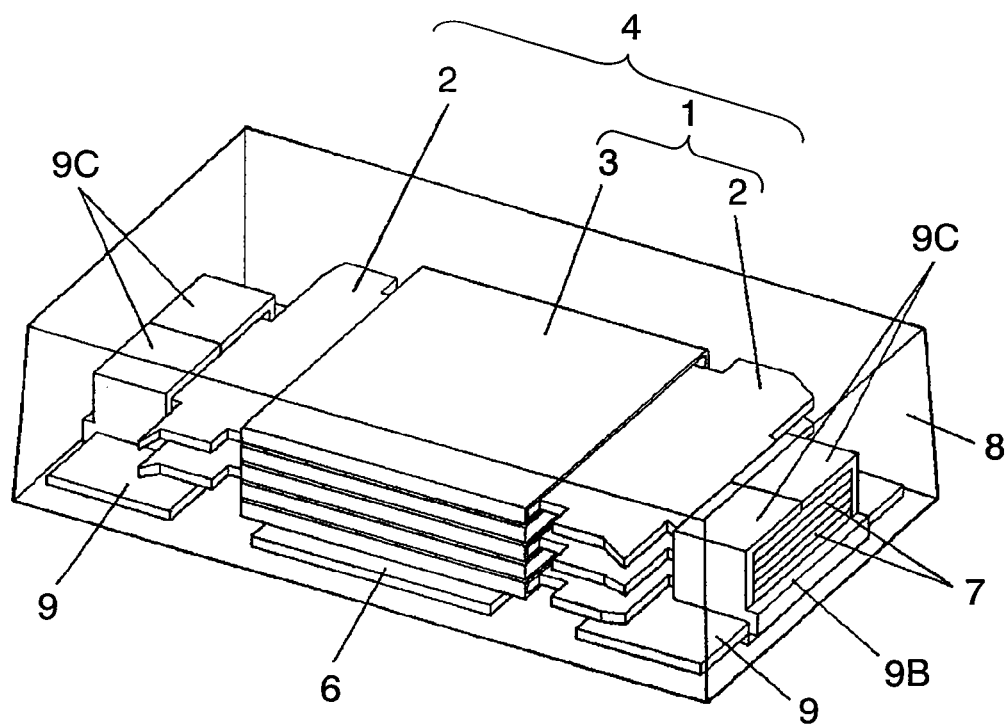
FIG. 6A is a perspective view through a transparent top face illustrating an inner structure of a chip type solid electrolytic capacitor in accordance with a second exemplary embodiment of the present invention.
Figure 6B:
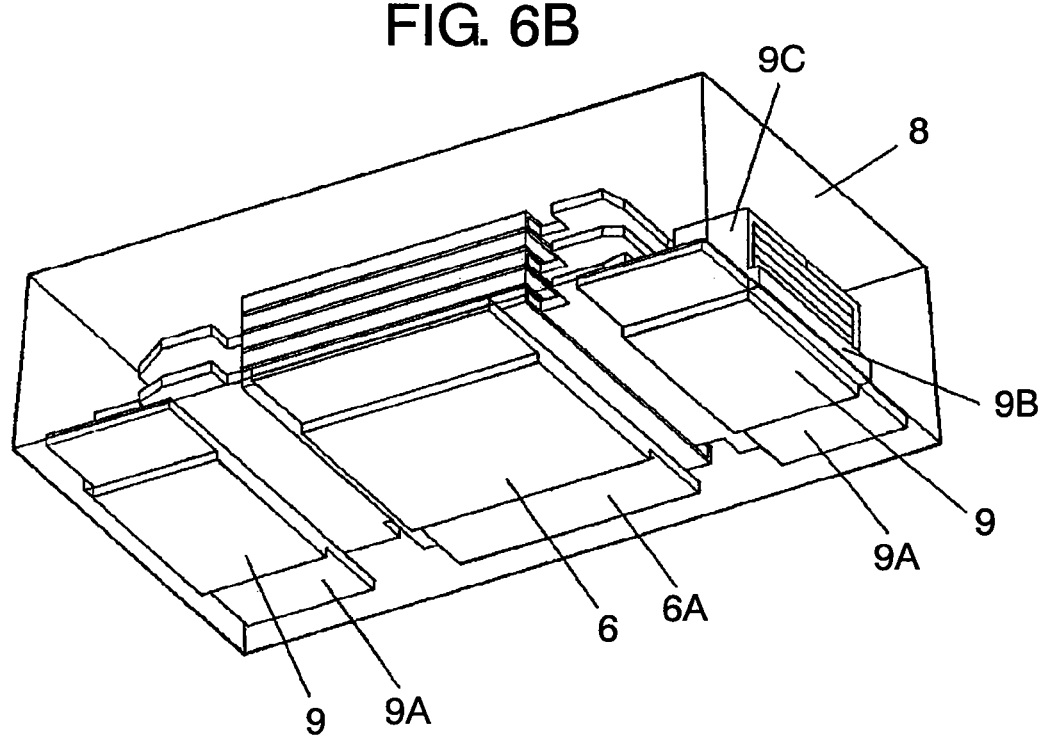
FIG. 6B is a perspective view through a transparent bottom face of the chip type solid electrolytic capacitor shown in FIG. 6A.

FIGS. 6A and 6B are perspective views through a transparent top and bottom faces, respectively, illustrating an inner structure of a chip type solid electrolytic capacitor in accordance with a second exemplary embodiment of the present invention. This exemplary embodiment is different from the chip type solid electrolytic capacitor of the first exemplary embodiment in the structure of the anode lead terminal. The other components are the same as those of the first exemplary embodiment.

Thinner parts 9A and joint 9B are integrally provided on each of anode lead terminals 9. This structure is the same as each anode lead terminal 5 of the first exemplary embodiment. Further, anode joint 9C is integrally provided on each of anode lead terminals 9 to be bent and joined along the outer periphery of anode portions 2 of capacitor elements 1 constituting laminate 4.

The chip type solid electrolytic capacitor of this exemplary embodiment structured as above has the same advantages obtained by the chip type solid electrolytic capacitor of the first exemplary embodiment. In addition to these advantages, anode joint 9C allows anode portions 2 of respective capacitor elements 1 to precisely be positioned during fabrication of laminate 4. When anode portions 2 of respective capacitors 1 and anode lead terminal 9 are joined to each other by leaser welding, resistance welding, or other methods, anode joint 9C is also welded at the same time. This method can stabilize the joining operation and joining strength.

Chip type solid electrolytic capacitors having such a structure are fabricated and the ESL characteristics thereof are evaluated. The evaluation results are described as follows. The chip type solid electrolytic capacitors in accordance with this exemplary embodiment have an average ESL of 165 pH, and a variation ($\sigma$) in ESL of 1.31 pH. On the other hand, as described above, capacitors having the conventional structure of FIG. 10 have an average ESL of 522 pH, and a variation ($\sigma$) in ESL of 17.93 pH. As shown in these results, the structure of this exemplary embodiment can reduce ESL to approx. one third of that of the conventional capacitor and has a smaller variation. For these reasons, this exemplary embodiment can sufficiently satisfy the recent high demands for supporting higher frequencies.

Third Exemplary Embodiment

Figure 7A:
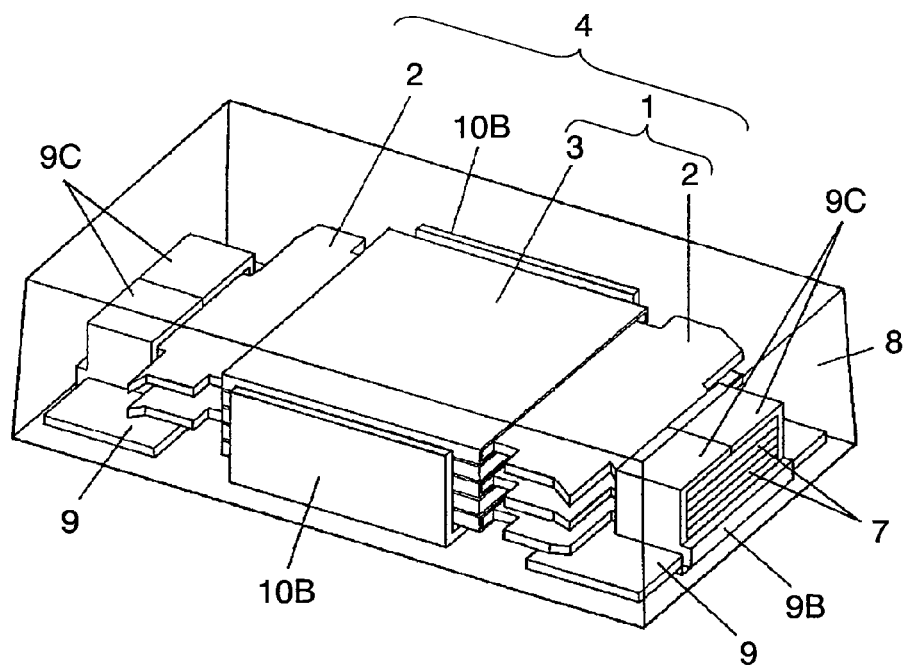
FIG. 7A is a perspective view through a transparent top face illustrating an inner structure of a chip type solid electrolytic capacitor in accordance with a third exemplary embodiment of the present invention.
Figure 7B:
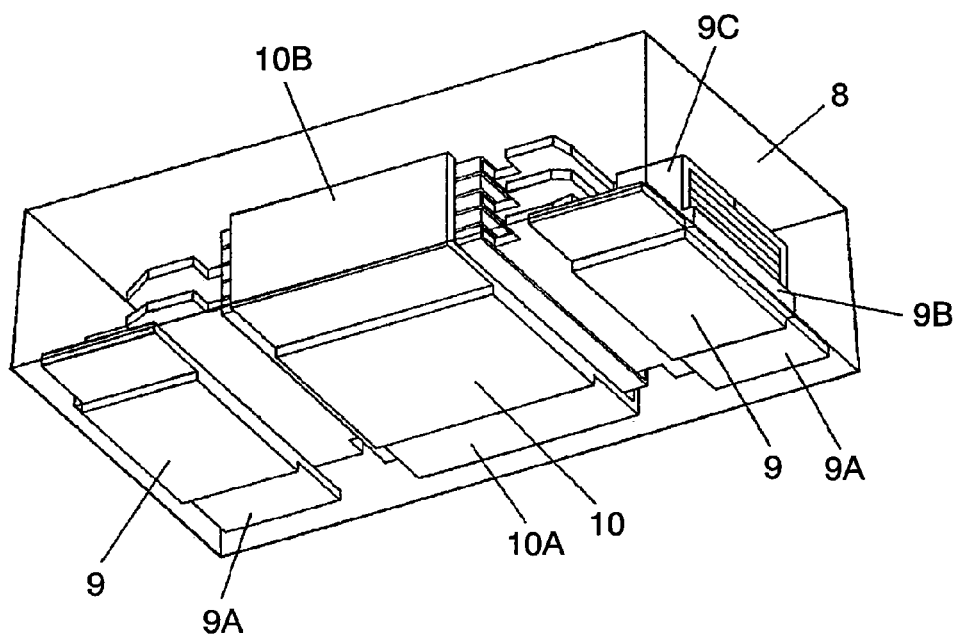
FIG. 7B is a perspective view through a transparent bottom face of the chip type solid electrolytic capacitor shown in FIG. 7A.

FIGS. 7A and 7B are perspective views through a transparent top and bottom faces, respectively, illustrating an inner structure of a chip type solid electrolytic capacitor in accordance with a third exemplary embodiment of the present invention. This exemplary embodiment is different from the chip type solid electrolytic capacitor of the second exemplary embodiment in the structure of the cathode lead terminal. The other components are the same as those of the second exemplary embodiment.

Thinner parts 10A are integrally provided on cathode lead terminal 10. This structure is the same as cathode lead terminals 6 of the first and second exemplary embodiments. Cathode lead terminal 10 further includes guide walls 10B rising from both ends in the direction that crosses the direction connecting anode portions 2 and cathode portion 3, i.e. the ends of thinner part 10A. Guide walls 10B position the side faces of cathode portions 3.

The chip type solid electrolytic capacitor of this exemplary embodiment structured as above has the same advantages obtained by the chip type solid electrolytic capacitor of the first and second exemplary embodiments. In addition to these advantages, guide walls 10B allow cathode portions 3 of respective capacitor elements 1 to precisely be positioned during fabrication of laminate 4. This structure can stabilize the dimensional precision and improve the workability during fabrication of chip type solid electrolytic capacitors.

Chip type solid electrolytic capacitors having such a structure are fabricated and the ESL characteristics thereof are evaluated. The evaluation results are described as follows. The chip type solid electrolytic capacitors in accordance with this exemplary embodiment have an average ESL of 166 pH, and a variation ($\sigma$) in ESL of 1.28 pH. On the other hand, as described above, capacitors having the conventional structure of FIG. 10 has an average ESL of 522 pH, and a variation ($\sigma$) in ESL of 17.93 pH. As shown in these results, the structure of this exemplary embodiment can reduce ESL to approx. one third of that of the conventional capacitor and has a smaller variation. For these reasons, this exemplary embodiment can sufficiently satisfy the recent high demands for supporting higher frequencies.

Fourth Exemplary Embodiment

Figure 8:
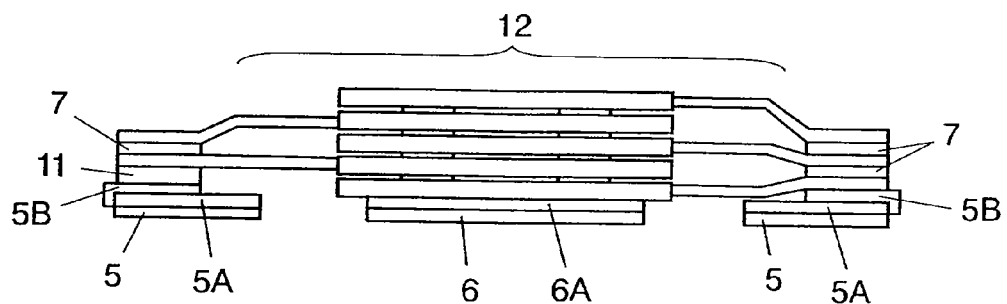
FIG. 8 is a side elevational view illustrating a structure of a capacitor element-laminate for use in a chip type solid electrolytic capacitor in accordance with a fourth exemplary embodiment of the present invention.
Figure 9:
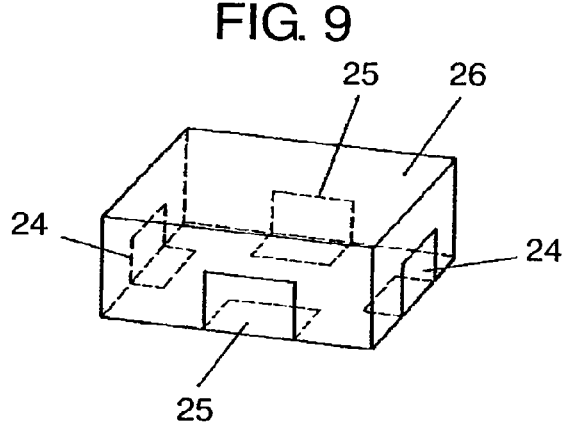
FIG. 9 is a perspective view of a structure of a conventional chip type solid electrolytic capacitor.

FIG. 8 is a side elevational view illustrating a structure of a capacitor element-laminate for use in a chip type solid electrolytic capacitor in accordance with a fourth exemplary embodiment of the present invention. This exemplary embodiment is different from the chip type solid electrolytic capacitor of the first exemplary embodiment in the partial structure of the capacitor element-laminate. The other components are the same as those of the first exemplary embodiment.

Spacer 11 is disposed between anode lead terminal 5 and anode portion 2 of a second sheet of capacitor element 1 constituting capacitor element-laminate (hereinafter abbreviated as "laminate") 12 that is placed above cathode lead terminal 6 and anode lead terminal 5. In other words, spacer 11 is provided between joint 5B and anode portion 2 of capacitor element 1 so as to adjust the gap formed therebetween.

Anode portions 2 of respective capacitor elements 1 are placed above and joined to joint 5B of anode lead terminal 5 by laser welding, resistance welding, or other methods, to form laminate 12. Laminate 12 is made by laminating a plurality of capacitor elements 1 so that anode portions 2 of adjacent capacitor elements 1 are placed in the direction opposite to each other. For this reason, when anode portions 2 are placed on joint 5B, anode portions 2 have to be bent. Particularly between anode portion 2 of the second sheet of capacitor element 1 and anode lead terminal 5, a large gap is formed by a first sheet of capacitor element 1 laminated under the second sheet. This gap is likely to generate a large load applied on anode portion 2. In this exemplary embodiment, spacer 11 is provided. Spacer 11 relieves the load imposed on anode portion 2. This structure can prevent the breakage or the like of anode portion 2.

Alternatively, instead of spacer 11, joint 5B of anode lead terminal 5 in contact with anode portion 2 of the second sheet of capacitor element 1 may be made thicker than joint 5B of the other anode lead terminal 5. This structure can offer the same advantage.

INDUSTRIAL APPLICABILITY

A chip type solid electrolytic capacitor of the present invention has a three-terminal structure that includes anode terminals disposed at both ends of the bottom face thereof, and a cathode terminal disposed therebetween. This structure allows magnetic fluxes generated by the current through the respective terminals to cancel out each other and considerably reduces ESL. A structure having a distance between each terminal as small as possible has an advantage of further reducing the ESL. The present invention is useful as a capacitor particularly in the fields requiring high-frequency responsibility.

What is claimed:

1. A chip type solid electrolytic capacitor including a mounting surface thereon, the chip type solid electrolytic capacitor comprising:
   a capacitor element-laminate made of at least a first capacitor element and a second capacitor element laminated to each other, each of the first and second capacitor elements having an anode portion and a cathode portion, a first end of each of the first and second capacitor elements being a part of the respective anode portion and a second end opposite the first end being a part of the respective cathode portion, the anode portions of the first and second capacitor elements each being disposed in a direction opposite to each other;
   a first anode lead terminal having a first upper face and a first bottom face, the first upper face being joined to the anode portion of the first capacitor element;
   a second anode lead terminal having a second upper face and a second bottom face, the second upper face being joined to the anode portion of the second capacitor element;
   a cathode lead terminal having a cathode lead terminal upper face and a cathode lead terminal bottom face, the cathode lead terminal upper face being joined to the cathode portion of the first capacitor element;
   an electrically insulating exterior resin coating the capacitor element-laminate while exposing at least a part of the first bottom face of the first anode lead terminal, a part of the second bottom face of the second anode lead terminal, and a part of the cathode lead terminal bottom face of the cathode lead terminal.

2. The chip type solid electrolytic capacitor according to claim 1,
   wherein the first capacitor element is one of first capacitor elements, the chip type solid electrolytic capacitor comprises the first capacitor elements having respective anode portions, and the chip type solid electrolytic capacitor further comprises a spacer disposed between the respective anode portions of the first capacitor elements.

3. The chip type solid electrolytic capacitor according to claim 1,
   wherein the second capacitor element is one of second capacitor elements, the second capacitor elements, and the chip type solid electrolytic capacitor further comprises a spacer disposed between the respective anode portions of the second capacitor elements.

4. The chip type solid electrolytic capacitor according to claim 1, wherein side faces of the first and second anode lead terminals are coated with the exterior resin.

5. A chip type solid electrolytic capacitor including a mounting surface thereon, the chip type solid electrolytic capacitor comprising:
   a capacitor element-laminate made of at least a first capacitor element and a second capacitor element laminated to each other, each of the first and second capacitor elements having an anode portion and a cathode portion, the anode portions of the first and second capacitor elements each being disposed in a direction opposite to each other;
   a first anode lead terminal having a first upper face and a first bottom face, the first upper face being joined to the anode portion of the first capacitor element;
   a second anode lead terminal having a second upper face and a second bottom face, the second upper face being joined to the anode portion of the second capacitor element;
   a cathode lead terminal having a cathode lead terminal upper face and a cathode lead terminal bottom face, the cathode lead terminal upper face being joined to the cathode portion of the first capacitor element on a bottom face of the capacitor element-laminate;
   an electrically insulating exterior resin coating the capacitor element-laminate while exposing at least a part of the first bottom face of the first anode lead terminal, a part of the second bottom face of the second anode lead terminal, and a part of the cathode lead terminal bottom face of the cathode lead terminal.

6. A chip type solid electrolytic capacitor including a mounting surface thereon, the chip type solid electrolytic capacitor comprising:
   a capacitor element-laminate made of at least a first capacitor element and a second capacitor element laminated to each other, each of the first and second capacitor elements having an anode portion and a cathode portion, the anode portions of the first and second capacitor elements each being disposed in a direction opposite to each other;
   a plate-shaped first anode lead terminal having a first upper face and a first bottom face, the first upper face being joined to the anode portion of the first capacitor element;
   a plate-shaped second anode lead terminal having a second upper face and a second bottom face, the second upper face being joined to the anode portion of the second capacitor element;
   a plate-shaped cathode lead terminal having a cathode lead terminal upper face and a cathode lead terminal bottom face, the cathode lead terminal upper face being joined to the cathode portion of the first capacitor element;
   an electrically insulating exterior resin coating the capacitor element-laminate while exposing at least a part of the first bottom face of the first anode lead terminal, a part of the second bottom face of the second anode lead terminal, and a part of the cathode lead terminal bottom face of the cathode lead terminal.

* * * * *